(12) United States Patent
Cordiero

(10) Patent No.: US 6,752,340 B2
(45) Date of Patent: Jun. 22, 2004

(54) GARLIC PROCESSOR

(76) Inventor: Arthur Cordiero, 4746 N. Enoch Rd., Cedar City, UT (US) 84720

( * ) Notice: Subject to any disclaimer, the term of this patent is extended or adjusted under 35 U.S.C. 154(b) by 115 days.

(21) Appl. No.: 09/989,930

(22) Filed: Nov. 20, 2001

(65) Prior Publication Data

US 2003/0094522 A1 May 22, 2003

(51) Int. Cl.⁷ ............................................. A47J 43/046
(52) U.S. Cl. ................................ 241/199.12; 241/273.2
(58) Field of Search ................................ 241/92, 101.2, 241/199.12, 273.2

(56) References Cited

U.S. PATENT DOCUMENTS

| | | | |
|---|---|---|---|
| 3,892,365 A | * | 7/1975 | Verdun ........................ 241/92 |
| 4,199,112 A | * | 4/1980 | McLean ...................... 241/92 |
| 4,768,429 A | | 9/1988 | Federighi |
| 4,998,466 A | | 3/1991 | Nagaoka |
| 5,065,672 A | | 11/1991 | Federighi |
| 5,158,011 A | | 10/1992 | Chen |
| 5,465,657 A | | 11/1995 | Wu |
| 5,537,918 A | * | 7/1996 | Patel et al. ................... 99/510 |
| 5,996,483 A | | 12/1999 | Yip |

* cited by examiner

*Primary Examiner*—Mark Rosenbaum
(74) *Attorney, Agent, or Firm*—Thorpe North & Western, LLP

(57) ABSTRACT

A garlic processor for processing a garlic clove having a husk includes a motor having a spindle, a cutting disk, disposed on the spindle and having cutting surfaces, and a cover, having a bottom opening, configured to removably mount with the bottom opening surrounding the cutting disk. The motor gives the cutting disk a rotational speed sufficient to both (i) remove the husk of a garlic clove which comes in contact therewith, and (ii) mash the garlic clove and fling particles thereof outwardly onto the inside surface of the cover.

20 Claims, 3 Drawing Sheets

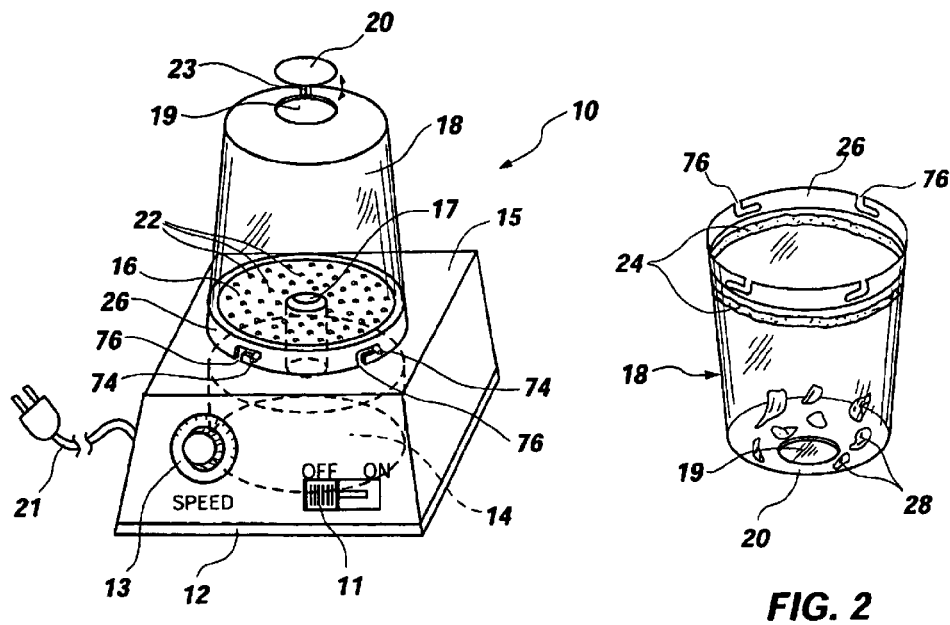
FIG. 1
FIG. 2
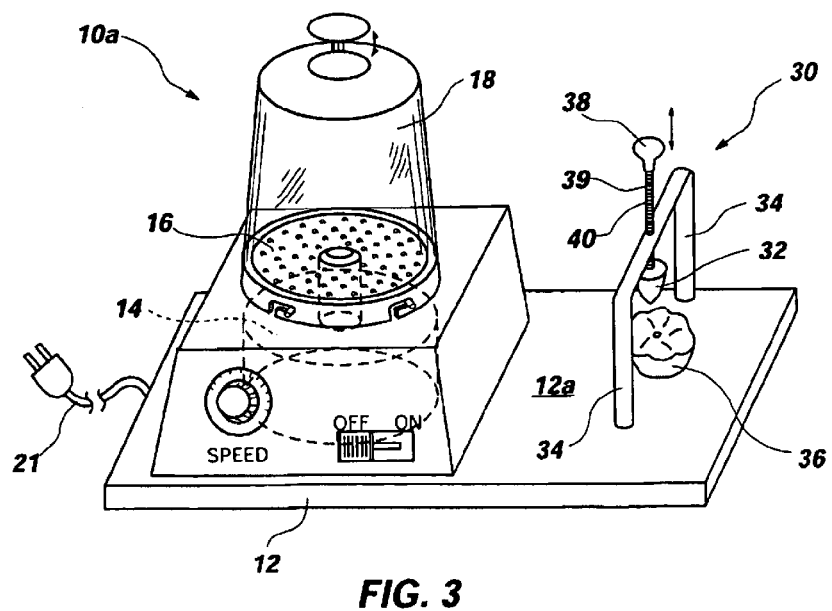
FIG. 3

GARLIC PROCESSOR

BACKGROUND OF THE INVENTION

1. Field of the Invention

The present invention relates generally to food processing devices. More particularly, the present invention relates to a garlic processor which both separates the husk from a clove of garlic, and mashes the garlic.

2. Related Art

There are many devices for cutting, chopping, mashing, and otherwise processing food products. Many of these involve motorized cutting blades or wheels which can be configured in a variety of ways for producing a variety of cut configurations—e.g. shoestring potatoes, cucumber slices, and diced vegetables.

Some food materials, however, are difficult to process by machine, and are thus frequently prepared by hand, as has been done throughout history. Garlic is one such food item. Garlic is difficult to process because the bulb must first be broken, then the individual cloves must be peeled to remove the inedible husk. Only then can the garlic clove be cut or mashed to put it into a useable form. This process is tedious, labor-intensive, and tends to release large quantities of odor. All of these conditions can be objectionable.

SUMMARY OF THE INVENTION

It has been recognized that it would be advantageous to develop a garlic processor that reduces or eliminates hand labor associated with preparing garlic for use in food.

It would also be advantageous to develop a garlic processor that both separates the husk from the clove, and mashes the garlic.

It would also be advantageous to develop a garlic processor that reduces the amount of strong garlic odor that is released into the air during the processing of the garlic.

The invention advantageously provides a garlic processor for processing a garlic clove having a husk, comprising a motor having a spindle, a cutting disk, disposed on the spindle and having cutting surfaces, and a cover, having a bottom opening, configured to removably mount with the bottom opening surrounding the cutting disk. The motor gives the cutting disk a rotational speed sufficient to both (i) remove the husk of a garlic clove which comes in contact therewith, and (ii) mash the garlic clove and fling particles thereof outwardly onto the inside surface of the cover.

In accordance with a more detailed aspect thereof, the invention provides a device for husking and mashing garlic, comprising a base, a motor disposed on the base, a hub connected to and powered by the motor, rotatable about a substantially vertical axis, a substantially planar cutting disk, removably disposable on the hub, having cutting surfaces on a top surface thereof, and configured to rapidly rotate with the hub, and a container, removably mountable surrounding the disk, and extending upwardly therefrom, having an inside surface, and a top opening. The motor causes the disk to rotate at a speed sufficient to both (i) remove the garlic husk, and (ii) mash the garlic clove and fling the particles thereof outwardly onto the inside surface of the cover when a garlic clove is inserted into the top opening and contacts the cutting surfaces of the disk.

In accordance with another more detailed aspect thereof, the invention provides a method of husking and mashing garlic, comprising the steps of: (a) inserting a clove of garlic into a container having an inside surface and surrounding a horizontal cutting disk disposed at the bottom thereof, the cutting disk having cutting surfaces; (b) rapidly rotating the cutting disk, such that the cutting surfaces repeatedly contact the clove of garlic, thereby removing the husk from the clove, and gradually removing small particles of the meat of the clove and centrifugally flinging the particles onto the inside surface of the container, the particles comprising mashed garlic; and (c) removing the container from around the disk so as to gain access to the mashed garlic and the removed husk.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 1 is a perspective view of one embodiment of a garlic processor in accordance with the present invention.

FIG. 2 is a perspective view of the container removed from the base of the garlic processor of FIG. 1, and inverted to allow removal of the husk and the meat of the garlic.

FIG. 3 is a perspective view of an alternative embodiment of a garlic processor in accordance with the present invention, including a garlic bulb splitter.

DETAILED DESCRIPTION

Figure 4A:
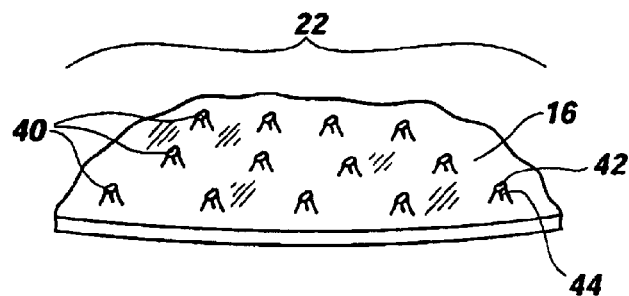
FIGS. 4A–4C are partial perspective views of alternative configurations of the cutting surfaces of the disk.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Viewing FIG. 1, the garlic processor 10 generally comprises a base 12, a motor 14, a horizontal rotating cutting disk or rotor 16, and a container or cover 18, which is open on the bottom, and removably fits over the disk. The motor is preferably covered by a housing 15, which underlies the disk 16, and to which the removable cover 18 attaches.

Figure 5:
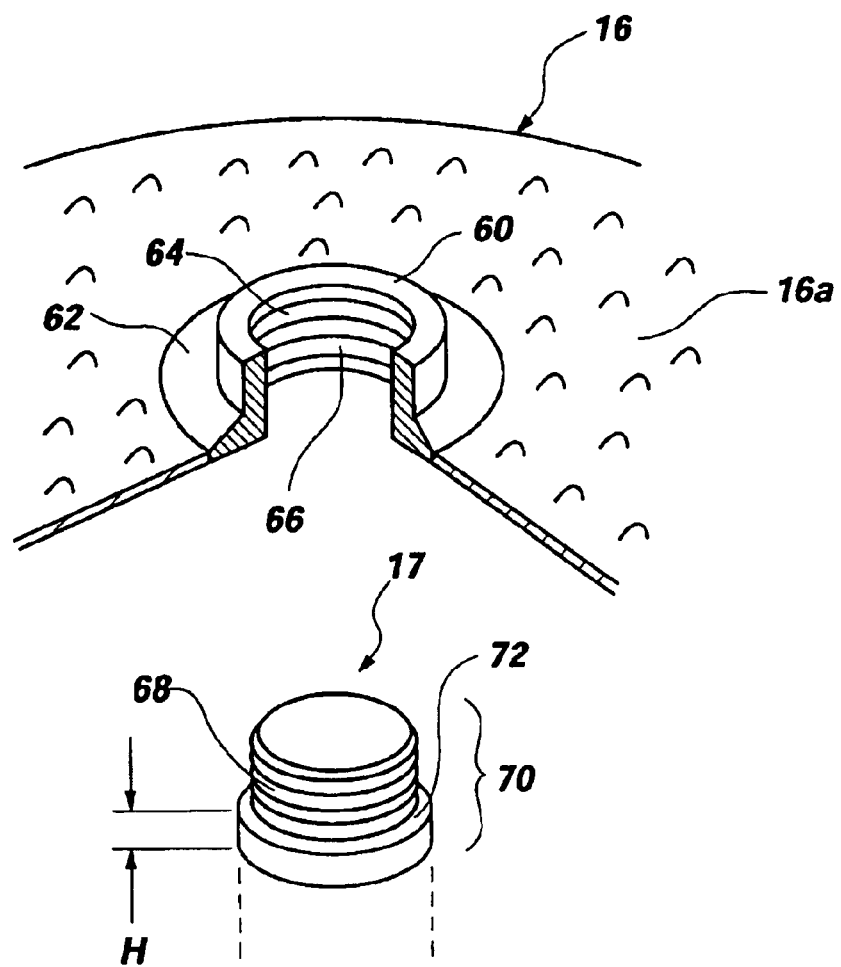
FIG. 5 is a pictorial, partial cross-sectional view of one embodiment of the motor spindle and a cutting disk, showing details of how the two are attached.

The cutting disk 16 is removably mounted upon a shaft or spindle 17, which is driven by the motor 14. This configuration allows the cutting disk to be removed for easy cleaning. It will be apparent that the mechanism which removably connects the cutting disk to the spindle may be configured in a variety of ways. For example, in one embodiment, shown in FIG. 5, the cutting disk 16 is provided with a central collar 60, which includes a flange 62 that is soldered, brazed, riveted, or otherwise securely fastened into the center of the disk. A device known as a "tee nut" may be used for the collar as depicted.

The central opening 64 of the collar 60 includes spiral threads 66, which are configured to screw onto mating spiral threads 68 formed on the top 70 of the spindle 17. The top of the spindle also includes a shoulder 72, against which the collar 60 abuts when completely screwed on. Using the tee nut collar 60 as shown, the disk 16 may be securely fastened to the spindle with only about one and a half or two turns of the threads. This allows easy attachment or removal of the disk as desired. The threads on the spindle and the collar preferably have an orientation such that rotation of the spindle tends to tighten, not loosen the threads.

The cutting disk includes a plurality of cutting surfaces 22 which are configured to grab and cut the garlic clove when the disk is rapidly rotating, to both (i) remove the husk of a garlic clove which comes in contact with the disk, and (ii) mash the garlic clove and fling particles thereof outwardly onto the inside surface of the cover. These cutting surfaces may take one of many configurations. For example, the cutting surfaces may comprise upwardly protruding rounded punctures 40, as depicted in FIG. 4A. These rounded punctures are similar to those of a fine cheese grater, comprising a hole 42 having upwardly protruding sharp edges 44 therearound.

Figure 4B:
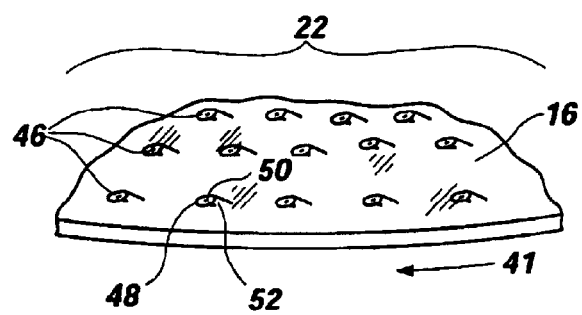

Alternatively, as shown in FIG. 4B, the cutting surfaces 22 may comprise a plurality of directionally oriented grating holes 46. These structures include a hole 48 with a raised cutting edge 50 and sloping rearward portion 52, similar to a coarse cheese grater. The directionally oriented grating holes 46 are all oriented such that the raised cutting edges face in the direction of rotation (indicated by arrow 41) of the disk. With this configuration, upon contact with the garlic clove, the blades each grab and cut off a small portion of the garlic clove, whether the husk or the meat, simultaneously propelling the clove upward and forward, and flinging the small portion of garlic tangentially outward due to the rotation of the disk.

Figure 4C:
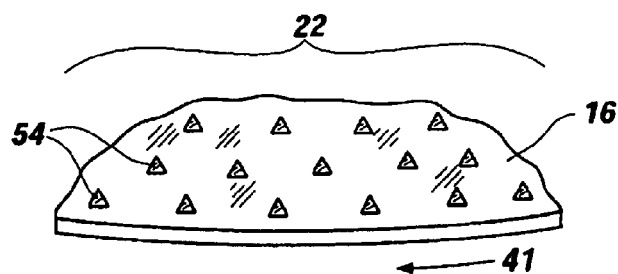

As yet another alternative, the cutting surfaces 22 may comprise upwardly protruding planar blades 54, shown in FIG. 4C. These blades angularly extend upward, all pointing in the direction of rotation of the disk 16, and grab and cut the garlic clove in a manner similar to that of the directionally oriented grating holes 46 discussed above. It will be apparent that other configurations of the cutting surfaces 22 may also be used in connection with the present invention.

Because it is used in food preparation, the cutting disk 16 is preferably formed of stainless steel, though other materials such as aluminum may also be used. Referring again to FIG. 5, the central collar 60 is likely to be fabricated separately from the planar portion 16a of the disk (though integral forming methods may be devised), and then brazed, welded, or otherwise attached around the perimeter of the flange 62 to the planar portion 16a of the disk. It will be apparent that, for strength or other reasons, the collar 60 may be formed of a material different from the planar portion 16a, so long as the two materials may be adequately attached, and are compatible with each other and with the intended use of the device. The length of the spindle 17 and the location of the shoulder 72 are chosen such that the shoulder supports the disk 16 a small distance H above the top surface of the motor housing (15 in FIG. 1). The distance H may be about ¼", for example.

It will be apparent that a variety of removable mounting configurations may be employed for attaching the cover 18 to the housing 15. Viewing FIG. 1 and FIG. 2, a series of upwardly oriented, L-shaped bars 74 (with outwardly oriented horizontal portions) are disposed in a circle on the top of the housing 15 around the disk 16. The cover 18 includes a corresponding series of L-shaped slots 76 formed in its bottom rim 26. To attach the cover 18 to the housing 15, a user places the bottom rim of the cover over the L-shaped bars 74, such that the ends of the bars slide into the vertical portion of the L-shaped slots 76. The user then rotates the cover 18, so that the ends of the bars 74 slide into the horizontal portion of the slots 76. The horizontal portion of the slots 76 are slightly tapered, thus producing a wedge effect, which securely holds the cover to the housing.

The removable container or cover 18 includes an opening 19 in its top, and a hatch 20, connected to the container by a hinge 23, which allows the opening to be selectively closed. The container may be transparent as shown in the figures, but does not necessarily need to be so. In use, with the container 18 attached to the motor housing 15 and surrounding the disk 16, one or more garlic cloves are inserted into the container through the opening 19, and dropped onto the disk. The cover 18 surrounds the disk, with a relatively small clearance therearound, so that the disk may freely rotate, but such that there is not a large gap at the outer edge of the disk into which particles of garlic may fall without being processed. It will be apparent that before the motor 14 is actuated, the hatch 20 is preferably closed for safety reasons, and to contain the garlic husk and meat.

After inserting one or more garlic cloves through the opening 19, with the hatch 20 closed, the user turns on the motor 14 using power switch 11, which causes the disk 16 to spin at a high speed. The inventor has found that for a disk having a diameter of about 3¼", a rotational speed of about 2500 rpm can be effectively used. If the speed is too high, the garlic husk may tend to fly around too much. Alternatively, a speed that is too slow may not quickly or effectively husk and mash the garlic. It will be apparent that the appropriate rotational speed of the disk may vary with different diameter disks, and the invention may be embodied in a variety of different sizes and configurations.

The motor 14 may be a variable speed motor, having a speed control dial 13 for allowing adjustment of the motor speed. An adjustable speed motor may be particularly useful, for example, where cutting disks of various sizes are provided for use with the same motor unit. Power for the motor is provided through power cord 21, which is configured to insert into a conventional 110 v AC electrical outlet. It will be apparent that the motor 14 may run directly on AC, or may be a DC motor, with a transformer (not shown) in the housing 15 to convert the inpout power. As yet another alternative, the device may utilize a DC motor and be configured to be battery operated.

As the disk 16 spins, it both (i) grabs and removes the husk of the garlic clove, and (ii) gradually grinds the meat of the garlic from the clove and flings it outwardly onto the inside surface of the container 18. Given the relatively light weight and dry surface of the husk, it tends to be propelled upward in relatively large chunks toward the hatch 20, apparently due to the centrifugal motion imparted to it by the disk, and perhaps also due to the air vortex created by the rotation of the disk. At the same time, the cutting surfaces cut small particles off of the clove, and fling these particles outwardly onto the inside surface of the cover or container. This process advantageously removes the husk from the clove, and mashes the meat of the garlic.

After a sufficient time, the user may stop the motor 14 and remove the container 18. After removal, with the container inverted from its original position as shown in FIG. 2, the meat of the garlic clove will be mashed and stuck to the inside of the container in a ring 24 near the container rim 26, allowing the user to easily remove it with a spoon, knife, or other utensil. The husk 28 will tend to be loose and disposed toward the hatch 20. After removal of the garlic, the husk may be easily dumped from the container, and the disconnected container can be easily cleaned.

Shown in FIG. 3 is an alternative embodiment of a garlic processor device 10a which includes a garlic bulb splitter 30 integrally connected to the processor. The bulb splitter 30 comprises a blunt arrow-shaped wedge 32, which is mounted on the working end of a rod 39 slidably disposed on a frame 34 above an extended portion 12a of the base 12. This device allows a user to place a bulb of garlic 36 on the base, with the core of the bulb oriented substantially vertically and centered below the wedge, and push down on the handle end 38 of the rod 39 to force the wedge 32 into the bulb 36 to break it into individual cloves. The splitter rod and wedge may be upwardly biased by a spring 40 for convenience.

It will be apparent that a garlic bulb splitter could also be configured in other ways not shown in the figures. For example, a wedge, similar to wedge 32, could be disposed on the end of a rod in a manner similar to an axe head. An opposite end of the rod could be pivotally connected to the base, such that when the rod is pivoted, the wedge rotates toward a striking position on the base. The user would place the garlic clove on the base below the striking position of the wedge, and pivotally drive the rod and wedge downward into the bulb to split it into individual cloves.

The invention thus provides a convenient appliance for processing garlic, having a spinning processing disk which both (a) separates the husk from the clove, and (b) mashes the garlic. Moreover, the invention comprises a food processing device in which the container 18 for holding the food is open on the bottom, and is inverted to retrieve the processed food.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A device for processing a garlic clove having a husk, comprising:
    a motor, contained within a housing;
    a rotatable cutting disk, disposed above the housing, operably coupled to the motor and rotated thereby, and having a top face with cutting surfaces;
    a cover, having an inside surface, a bottom opening, and a top opening, the cover being removably mountable to the housing, with the bottom opening surrounding the cutting disk, the cover being removable from the housing with the disk still coupled to the motor; and
    the cutting disk being configured to both (i) remove the husk of a garlic clove which comes in contact with the top face of the disk, and (ii) mash the garlic clove and fling particles thereof outwardly onto the inside surface of the cover.

2. A device according to claim 1, further comprising an attached garlic bulb splitter, configured to split a garlic bulb into individual cloves.

3. A device according to claim 1, further comprising a hatch, disposed adjacent the top opening of the cover, configured to be openable to allow a user to insert a garlic clove therethrough, and to be closeable to allow a user to close the top end of the cover during processing of the garlic clove.

4. A device according to claim 1, wherein the cutting disk rotates at a speed of about 2500 rpm.

5. A device according to claim 1, wherein the cutting disk has cutting surfaces selected from the group consisting of: upwardly protruding rounded punctures; directionally oriented grating holes; and upwardly protruding planar blades.

6. A device according to claim 1, wherein the cover is substantially transparent.

7. A device according to claim 1, further comprising interlocking structure, associated with a top surface of the housing and with the bottom opening of the cover, configured to allow selective attachment or detachment of the cover and the housing.

8. A device according to claim 7, further comprising a bottom rim at the bottom opening of the cover, the bottom rim being configured to contact the housing substantially along its entire length below the cutting disk when the cover is attached to the housing.

9. A device according to claim 1, wherein the cutting disk and the cover are configured to substantially prevent portions of the garlic clove from entering a region below the cutting disk.

10. A device according to claim 1, wherein the cover and the housing enclose a contained volume having a bottom defined by an upper surface of the housing, the cutting disk being disposed above the housing adjacent to the bottom of the contained volume.

11. A device for processing a garlic clove having a husk, comprising:
    a housing, having a substantially horizontal upper surface;
    a motor, contained within the housing;
    a cover, having an inside surface, a top opening, a substantially circular bottom opening, and a bottom rim at the bottom opening, the cover being configured to removably attach to the upper surface of the housing at the bottom rim, the cover and the housing enclosing a contained volume having a bottom defined by the upper surface of the housing; and
    a cutting disk, disposed above the housing adjacent to the bottom of the contained volume, having cutting surfaces on a top thereof, the cutting disk being operably coupled to the motor, and configured to rotate at a speed sufficient to (i) remove the husk of a garlic clove which comes in contact with the cutting surfaces of the disk, and (ii) mash the garlic clove and fling particles thereof outwardly onto the inside surface of the cover.

12. A device according to claim 11, wherein the cutting disk is about 3¼" in diameter, and rotates at a speed of about 2500 rpm.

13. A device according to claim 11, further comprising an attached garlic bulb splitter configured to split a garlic bulb into individual cloves.

14. A device according to claim 11, wherein the cutting disk is about 3¼" in diameter, and rotates at a speed of about 2500 rpm.

15. A device according to claim 11, further comprising a plurality of interlocking bars disposed on the top surface of the housing, and a plurality of interlocking slots disposed in the bottom rim of the cover, the cover being removably mountable to the housing by placing the bottom rim against the top surface of the housing below the cutting disk, with the bottom opening surrounding the cutting disk, and rotating the cover so as to engage the interlocking bars in the interlocking slots.

16. A device according to claim 11, wherein the cutting disk and the cover are configured to substantially prevent portions of the garlic clove from entering a region below the cutting disk.

17. A device for processing a garlic clove having a husk, comprising:

a motor, contained within a housing, the housing having a plurality of interlocking bars disposed on a top surface thereof;

a cutting disk, disposed above the housing, operably coupled to the motor and rotated thereby;

a substantially one-piece cover, having an inside surface, a bottom opening, and a top opening, the bottom opening having a bottom rim with a plurality of interlocking slots, the cover being removably mountable to the housing by placing the bottom rim against the top surface of the housing below the cutting disk, with the bottom opening surrounding the cutting disk, and rotating the cover so as to engage the interlocking bars in the interlocking slots, the cover being removable from the housing with the disk still coupled to the motor; and the cutting disk being configured to retain a garlic clove thereabove while rotating, and (i) remove the husk of the garlic clove, and (ii) mash the garlic clove and fling particles thereof outwardly onto the inside surface of the cover.

18. A device according to claim 17, wherein the cutting disk and the cover are configured to substantially prevent portions of the garlic clove from entering a region below the cutting disk.

19. A device according to claim 17, wherein the cutting disk is about 3¼ in diameter, and rotates at a speed of about 2500 rpm.

20. A device according to claim 17, wherein the cover and the housing enclose a contained volume having a bottom defined by an upper surface of the housing, the cutting disk being disposed above the housing adjacent to the bottom of the contained volume.

\* \* \* \* \*